(12) United States Patent
Bouchez et al.

(10) Patent No.: US 8,618,758 B2
(45) Date of Patent: Dec. 31, 2013

(54) ELECTRIC DEVICE COMPRISING AN ALTERNATING CURRENT ELECTRIC MOTOR AND A CONTROL INVERTER AND A METHOD FOR MEASURING THE ELECTROMOTIVE FORCE OF THIS DEVICE

(75) Inventors: Boris Bouchez, Cergy le Haut (FR); Luis de Sousa, Eragny sur Seine (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 168 days.

(21) Appl. No.: 13/167,108

(22) Filed: Jun. 23, 2011

(65) Prior Publication Data

US 2011/0316464 A1    Dec. 29, 2011

(30) Foreign Application Priority Data

Jun. 25, 2010 (FR) .................................. 10 55085

(51) Int. Cl.
*H02P 6/16* (2006.01)
(52) U.S. Cl.
USPC ............ 318/400.35; 318/400.34; 318/400.32; 318/531; 318/523; 318/459; 318/148; 318/145
(58) Field of Classification Search
USPC ............... 318/400.29, 400.34, 531, 523, 816, 318/400.35, 459, 145, 148
See application file for complete search history.

(56) References Cited

U.S. PATENT DOCUMENTS

| 4,047,087 | A | * | 9/1977 | Teiling ........................... 318/661 |
| 4,229,682 | A | * | 10/1980 | Goddijn ................... 318/400.26 |
| 4,654,566 | A |   | 3/1987 | Erdman |
| 5,708,337 | A |   | 1/1998 | Breit et al. |
| 5,929,590 | A | * | 7/1999 | Tang .............................. 318/701 |
| 6,051,942 | A | * | 4/2000 | French ........................ 318/254.1 |
| 6,124,689 | A | * | 9/2000 | Kardash ...................... 318/400.2 |
| 6,246,193 | B1 | * | 6/2001 | Dister ....................... 318/400.33 |
| 6,307,336 | B1 |   | 10/2001 | Goff et al. |
| 6,703,805 | B2 | * | 3/2004 | Griffitts ......................... 318/459 |
| 6,979,970 | B2 | * | 12/2005 | Iwanaga et al. ........... 318/400.35 |
| 7,301,298 | B2 | * | 11/2007 | Shao et al. ..................... 318/599 |
| 7,489,097 | B2 |   | 2/2009 | Fu et al. |
| 2003/0193306 | A1 |   | 10/2003 | Griffitts |

FOREIGN PATENT DOCUMENTS

EP    1564882 A2    8/2005

OTHER PUBLICATIONS

French Search Report issued in the corresponding French application No. 1055085, mailing date Apr. 19, 2011 (2 pages).

\* cited by examiner

*Primary Examiner* — Rita Leykin
(74) *Attorney, Agent, or Firm* — Osha Liang LLP

(57) ABSTRACT

The invention relates to an electric device (1) comprising an alternating current electric motor (3) and a control inverter (5) for controlling the phase or phases of the motor (3). The motor (3) comprises, on at least one winding of at least one phase (PA, PB, PC), a point (Ma, Mb, Mc) for measuring a voltage relative to a predefined potential (M), the measurement point (Ma, Mb, Mc) being chosen so that it divides the winding into a first (Za1; Zb1; Zc1) and a second (Za2; Zb2; Zc2) portion such that the electromotive forces ($e_{a1}$, $e_{a2}$) induced in the two portions are phase-shifted relative to one another and means (11A; 11B; 11C) for measuring the voltage between the measurement point and the predefined potential. The invention also relates to an associated method for measuring electromotive forces.

21 Claims, 6 Drawing Sheets

ELECTRIC DEVICE COMPRISING AN ALTERNATING CURRENT ELECTRIC MOTOR AND A CONTROL INVERTER AND A METHOD FOR MEASURING THE ELECTROMOTIVE FORCE OF THIS DEVICE

The present invention relates to an electric device comprising an alternating current electric motor and a control inverter and an associated method for measuring the electromotive force of this device, and applies to the field of alternating current electric motors.

The invention will be particularly applicable in the field of electric motor vehicles notably for traction inverters and their associated electric motor or even for air conditioning compressor inverters and their associated electric motor.

However, although particularly intended for such an application, the device and the associated method can be used in other fields such as, for example, power-assisted steering or for fan electric motors.

BACKGROUND OF THE INVENTION

Conventionally, an electric vehicle is equipped with high-voltage batteries delivering a direct current to an inverter which transforms this direct current into an alternating current for powering an electric motor, the latter driving the movement of the vehicle.

To control the motor and in particular to control the switches of the inverter, it is necessary to know the angular position of the motor in order to power each phase of the motor at the right moment to obtain an optimum driving torque.

This is generally done by position sensors, for example Hall effect encoders/sensors, positioned on the rotation axis of the electric motor as is, for example, described in the document U.S. Pat. No. 6,307,336.

However, it appears that these position detectors are a weak point in the system and cause the vehicle to stop should the sensor fail. Furthermore, these sensors are expensive.

In the document EP 1564882, auxiliary windings are proposed to directly measure the electromotive force of each phase of the motor.

However, this solution leads to complex modifications to the electric motor.

Moreover, as for the position sensor, it is not known whether, for example, the absence of the measurement signal originates from a failure of this auxiliary configuration or from a failure of the motor itself.

The document U.S. Pat. No. 7,489,097 describes an electric system comprising an alternating current motor and a control inverter for directly measuring the electromotive force of the phases of the motor. For this, the inverter has to control the motor in a particular way so that the phase for which the EMF is to be measured is not powered during the measurement.

It happens that the trapezoidal control of the phases makes it possible to have two phases powered and one not powered. In this case, the current is zero during a period that is long enough to measure the EMF and detect its zero crossing.

However, this way is not appropriate for example for sinusoidal motor controls.

OBJECT OF THE INVENTION

The aim of the present invention is to propose a device and a method that make it possible to directly access the electromotive force of the phases of the motor, and without any position sensor.

SUMMARY OF THE INVENTION

To this end, the subject of the invention is an electric device comprising an alternating current electric motor and a control inverter for controlling the phase or phases of the motor, characterized in that the motor comprises, on at least one winding of at least one phase, a point for measuring a voltage relative to a predefined potential, the measurement point being chosen so that it divides the winding into a first and a second portion such that the electromotive forces induced in the two portions are phase-shifted relative to one another and means for measuring the voltage between the measurement point and the predefined potential.

By choosing a measurement point directly at the level of the windings of the phases and such that it divides the winding into a first and a second portion such that the electromotive forces induced in the two portions are phase-shifted relative to one another, the shape of the motor controls becomes irrelevant.

According to one aspect, the means for measuring the voltage between the measurement point and the predefined potential are configured so as to measure the voltage while the inverter has switched the phases concerned to freewheeling mode.

According to another aspect, the windings of the motor are windings with centre point and the measurement point is the centre point of the winding.

Moreover, provision can be made for the electromotive force induced in each of the two portions of a winding to be of substantially equal amplitude.

Then, the inverter can be configured to synchronously switch all the phases to freewheeling mode to allow for the simultaneous measurement of the voltages for each phase of the motor.

According to one aspect, the inverter is a standard three-phase inverter.

According to a development, the inverter is an H-configuration three-phase bridge inverter.

The alternating current electric motor is, for example, a polyphase electric motor whose mechanical step corresponds to a fraction of the mechanical angle.

The alternating current electric motor may be an alternating current three-phase electric motor.

The device may comprise a motor control unit linked to said measurement means and configured to deduce, from the measurement result for each phase, the electromotive force for each of the phases of the motor and to control the inverter according to the measured electromotive forces.

The control unit is, for example, configured to deduce the angular position of the motor from the zero crossings of the electromotive forces of each phase.

Another subject of the invention targets a method for measuring the electromotive force of an electric device comprising an alternating current electric motor and a control inverter for controlling the phase or phases of the motor, characterized in that
  a voltage is measured between the measurement point of a winding of at least one phase and predefined potential, the measurement point being chosen so that it divides the winding into a first and a second portion such that the electromotive forces induced in the two portions are phase-shifted relative to one another.

According to one aspect, a voltage is measured between the measurement point of a winding of at least one phase and a predefined potential while the inverter has switched the phases concerned to freewheeling mode.

According to another aspect, the windings of the motor are windings with centre point and the measurement point is the centre point of the winding.

It is possible, for example, to provide for the electromotive force induced in each of the two portions of a winding to be of substantially equal amplitude.

It is possible to switch all the phases synchronously, for example by a pulse width modulation, to freewheeling mode to allow for the simultaneous measurement of the voltages for each phase of the motor.

The inverter is, for example, a standard three-phase inverter or an H-configuration three-phase bridge inverter.

The alternating current electric motor is, for example, a polyphase electric motor whose mechanical step corresponds to a fraction of the electrical angle.

The alternating current electric motor may be a three-phase electric motor.

According to one aspect, the electromotive force for each of the phases of the motor is deduced from the voltage measurements for each of the phases and the inverter is controlled according to the measured electromotive forces.

According to another aspect, the angular position of the motor is deduced from the zero crossings of the electromotive forces of each phase.

A diagnosis can be deduced from the measurement of the electromotive forces of each phase of the motor and a warning signal can be generated in case of failure of one of the phases.

BRIEF DESCRIPTION OF THE DRAWINGS

The present invention will be better understood from reading about a detailed exemplary embodiment with reference to the appended drawings, given by way of nonlimiting examples, in which.

DETAILED DESCRIPTION OF THE INVENTION

In all the figures, identical elements are given the same reference numbers.

Figure 1:
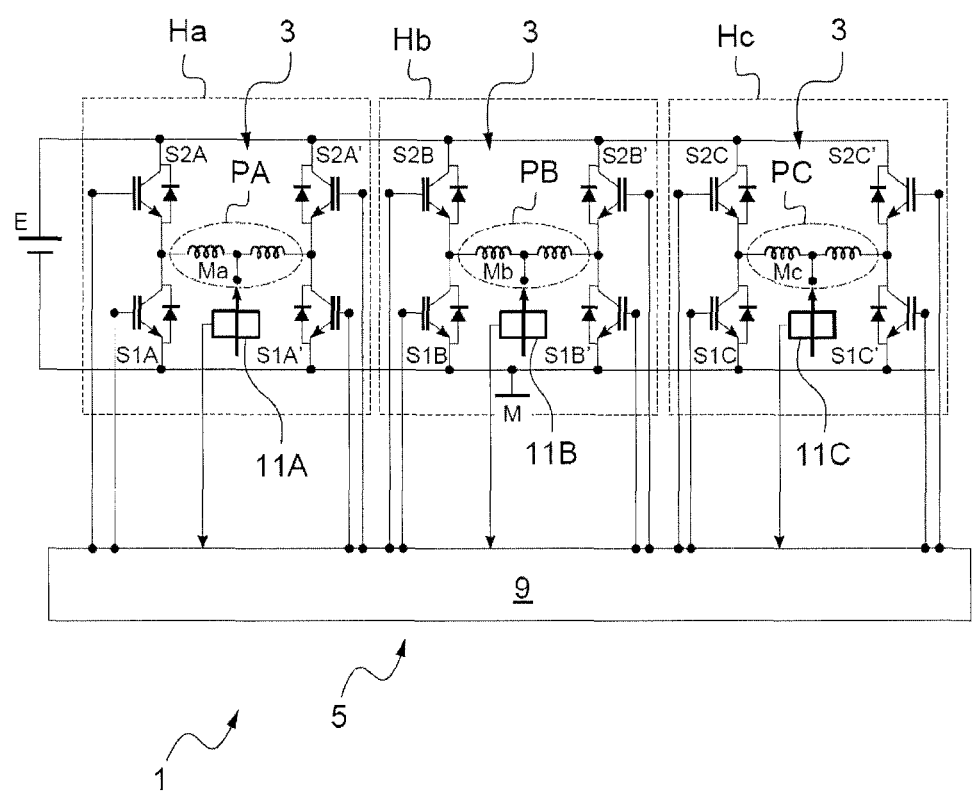
FIG. 1 schematically represents a first exemplary embodiment of the device.

FIG. 1 shows a device 1 according to the invention comprising, on the one hand, an alternating current electric motor 3 and, on the other hand, a control inverter 5 for controlling the phase or phases PA, PB and PC of the motor 3.

The expression "electric motor" should be understood to mean an electric machine which transforms an electrical energy into a mechanical motion when it is powered with current and which can also transform a mechanical motion into electrical energy (current generator).

In the present example, an electric motor 3 is a three-phase motor without neutral point whose three phases PA, PB and PC are each produced by windings with centre point Ma, Mb, and Mc. It will therefore be understood that the motor is only partially represented in this FIG. 1 by its windings serving as inductances.

The control inverter 5 for controlling the phases of the motor is, in this example, an H-configuration bridge three-phase inverter.

In this embodiment, the inverter comprises three H-configuration bridges, Ha, Hb and Hc.

Each H-configuration bridge comprises four switches Si,j (i=1,2; j=A, A', B, B', C, C'), the index i=1 being representative of the bottom portion of the bridge, also called foot of the bridge, and the index i=2 the top portion of the bridge. The index j, with or without prime mark, is representative of the phase to which the switch belongs.

The switches Si,j (i=1,2; j=A, A', B, B', C, C') are power switches, for example of the IGBT (insulated gate bipolar transistor) type which corresponds to a hybrid transistor, combining a metal-oxide semiconductor field-effect transistor (MOSFET) at the input and a bipolar transistor at the output.

The term "H-configuration bridge structure" or "H-configuration bridge" corresponds to an electrical or electronic circuit that is known per se.

With regard, for example, to the H-configuration bridge, Ha, it comprises four switching elements S1A, S2A, S1A' and S2A' usually schematically arranged in the form of an H as represented in FIG. 1, the two vertical branches being formed respectively by the switching elements S1A, S2A on one side and S1A' S2A' on the other side and arranged on either side of the horizontal branch of the H which corresponds to the load of the bridge, that is to say, to the winding of the phase PA of an electric motor 1.

Each switch Si,j is linked to a control unit 9 which applies PWM (Pulse Width Modulation) controls to make it possible to carry out various functions, such as, for example, the rotation of the motor in one direction or the other to propel an automotive vehicle.

The circuit is connected to a dc voltage source E. In the context of an application of this circuit to an automotive vehicle, this is, for example, accumulation means such as a power battery.

The motor 3 comprises, on at least one winding of at least one phase, a point for measuring a voltage relative to a predefined potential, the measurement point being chosen so that it divides the winding into a first and a second portion such that the electromotive forces induced in the two portions are phase-shifted relative to one another.

In the present example, these measurement points are advantageously made the same as the centre points Ma, Mb and Mc of the windings of the phases PA, PB and PC.

The device according to the invention also comprises means 11A, 11B and 11C for measuring the voltage between the measurement points Ma, Mb and Mc and a predefined potential, for example the ground M of the circuit, while the inverter has, for example, switched the phases concerned PA, PB, PC to freewheeling mode.

The switching of the phases PA, PB and PC to freewheeling mode is optional, but offers the advantage of eliminating the offset.

Figure 2:
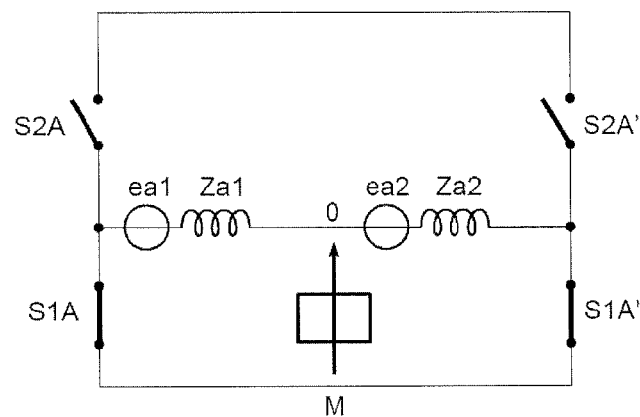
FIG. 2 schematically represents a detail of the device of FIG. 1.

For more detail, reference should be made to FIG. 2 which represents as an example the bridge Ha in detail whose switching elements are schematically represented by switches.

As can be seen, the switches of the foot of the bridge, that is to say the switches S1A and S1A' are closed, that is to say that the phase A has been switched by the inverter 5 to freewheeling mode.

The first portion of the winding is designated by its impedance Za1 and the second portion by its impedance Za2.

In this case, the following equations can be posited:

$$\begin{cases} V_{OM} = -e_{a1} - Z_{a1} * i_a \\ e_{a2} + Z_{a2} * i_a + e_{a1} + Z_{a1} * i_a = 0 \end{cases}$$

in which $V_{OM}$ is the voltage measured between the centre point of a winding of a phase and the ground of the circuit, $e_{a1}$ is the partial electromotive force induced in the first portion of impedance Za1, $e_{a2}$ is the partial electromotive force induced in the second portion of impedance Za2, $i_a$ is the current induced when the H-configuration bridge is switched to freewheeling mode as shown in FIG. 2.

If we assume for simplicity that Za1=Za2=Z (it should be noted that Za1 may differ from Za2), we obtain:

$$\begin{cases} V_{OM} = -e_{a1} - Z * i_a \\ Z * i_a = -\dfrac{e_{a2} + e_{a1}}{2} \end{cases} \Rightarrow \begin{cases} V_{OM} = \dfrac{e_{a2} - e_{a1}}{2} \end{cases}$$

As described above, the measurement point has been chosen so that the partial electromotive forces $e_{a1}$ and $e_{a2}$ are phase-shifted from one another. This can be obtained in different ways, in particular by using a polyphase alternating current electric motor whose mechanical step corresponds to a fraction of the electrical angle (for this explanation, this type of motor is called a fractional step electric motor) as will be explained in more detail later.

To simplify calculation, it is assumed that $e_{a1}$ and $e_{a2}$ of each half-coil of a phase are equal in amplitude (same induction, same number of turns) but are mutually phase-shifted.

This remains valid even if $e_{a1}$ and $e_{a2}$ contain harmonics whose phase shifts are the same for all the harmonics that are to be measured.

$e_{a1}$ and $e_{a2}$ can then be developed as follows:

$$\begin{cases} e_{a1} = \sum_{k=0}^{\infty} E_k \sin(w_k t) \\ e_{a2} = \sum_{k=0}^{\infty} E_k \sin(w_k t - \varphi_k) \end{cases}$$

in which $E_k$ is the amplitude of the harmonic k (k being a natural number) and $w_k$ is the pulsing or angular frequency of the harmonic.

By therefore calculating the voltage of the centre point as measurement point when the two switches S1A and S1A' of the foot of the bridge are closed, the phase PA therefore being in a "freewheeling" state, we obtain:

$$\begin{aligned} V_{OM} &= \frac{e_{a2} - e_{a1}}{2} \\ &= \sum_{k=0}^{\infty} \left( \frac{E_k}{2} \sin(w_k t) - \frac{E_k}{2} \sin(w_k t - \varphi_k) \right) \\ &= \sum_{k=0}^{\infty} \left( \frac{E_k}{2}(1 - \cos\varphi_k)\sin(w_k t) + \frac{E_k}{2}\sin(\varphi_k)\cos(w_k t) \right) \\ &= \sum_{k=0}^{\infty} (A_k E_k \sin(w_k t + \phi_k)) \end{aligned}$$

with $$\begin{cases} A_k = \dfrac{1}{2}\sqrt{2 - 2\cos\varphi_k} \\ \phi_k = \arctan\dfrac{\sin\varphi_k}{1 - \cos\varphi_k} \end{cases}$$

Given that the total electromotive force of a phase can be written as follows:

$$\begin{aligned} EMF &= e_{a2} + e_{a1} \\ &= \sum_{k=0}^{\infty} (E_k \sin(w_k t) + E_k \sin(w_k t - \varphi_k)) \\ &= \sum_{k=0}^{\infty} (E_k(1 + \cos\varphi_k)\sin(w_k t) - E_k \sin(\varphi_k)\cos(w_k t)) \\ &= \sum_{k=0}^{\infty} A'_k (E_k \cos(w_k t - \phi'_k)) \end{aligned}$$

with $$\begin{cases} A'_k = \sqrt{2 + 2\cos\varphi_k} \\ \phi'_k = \arctan\dfrac{\sin\varphi_k}{1 + \cos\varphi_k} \end{cases}$$

The result of this is that the measurement of $V_{OM}$ provides for a direct and faithful measurement of the electromotive forces (EMF) of each phase of the alternating current motor 3 if the EMF contains no harmonic.

An image of the EMF is therefore obtained, but in which each harmonic component is attenuated by a factor $$\frac{A_k}{A'_k}$$

et phase-shifted by an angle $\phi_k - \phi_k'$.
with $$\begin{cases} \dfrac{A_k}{A'_k} = \dfrac{1}{2}\sqrt{\dfrac{1 - \cos\varphi_k}{1 + \cos\varphi_k}} \\ \phi_k - \phi'_k = \arctan\dfrac{\sin\varphi_k}{1 - \cos\varphi_k} - \arctan\dfrac{\sin\varphi_k}{1 + \cos\varphi_k} \end{cases}$$

As an example, a machine with 5 pairs of poles and 12 teeth, called by those skilled in the art a 12-10 coil (see for example FIG. 10) makes it possible to obtain a phase-shift of π/6 between the two half-coils.

The following attenuation factors and phases are thus obtained:

$$\begin{cases} \dfrac{A}{A'} = \sqrt{\dfrac{1-\cos\varphi}{1+\cos\varphi}} \\ \phi - \phi' = \arctan\dfrac{\sin\varphi}{1-\cos\varphi} - \arctan\dfrac{\sin\varphi}{1+\cos\varphi} \end{cases}$$

The attenuation factor and the phase shift are fixed and known parameters that depend only on the construction of the motor 3. The EMF can therefore be measured easily, and for each of the phases of the motor, and without requiring either additional sensors or complex estimations or calculations.

This calculation can thus be done without difficulties in a similar manner with impedances with unequal values and/or EMFs with unequal amplitudes as long as the ratio of the EMFs or of the impedances is known.

The electromotive force of the motor 3 is therefore accessed without delay, without disturbances and without any specific filtering being necessary.

By virtue of this arrangement, a method for measuring the electromotive force is therefore implemented in which a voltage is measured between the measurement point of a winding of at least one phase and a predefined potential while the inverter has switched the phases concerned to freewheeling mode, the measurement point being chosen so that it divides the winding into a first and a second portion such that the electromotive forces induced in the two portions are phase-shifted relative to one another.

The electromotive force for each of the phases of the motor is then deduced from the voltage measurements for each of the phases and the inverter can be controlled according to the measured electromotive forces.

According to one exemplary embodiment, the inverter 5 is configured to synchronously switch all the phases to freewheeling mode to allow for the simultaneous measurement of the voltages for each phase of the motor.

Figure 3:
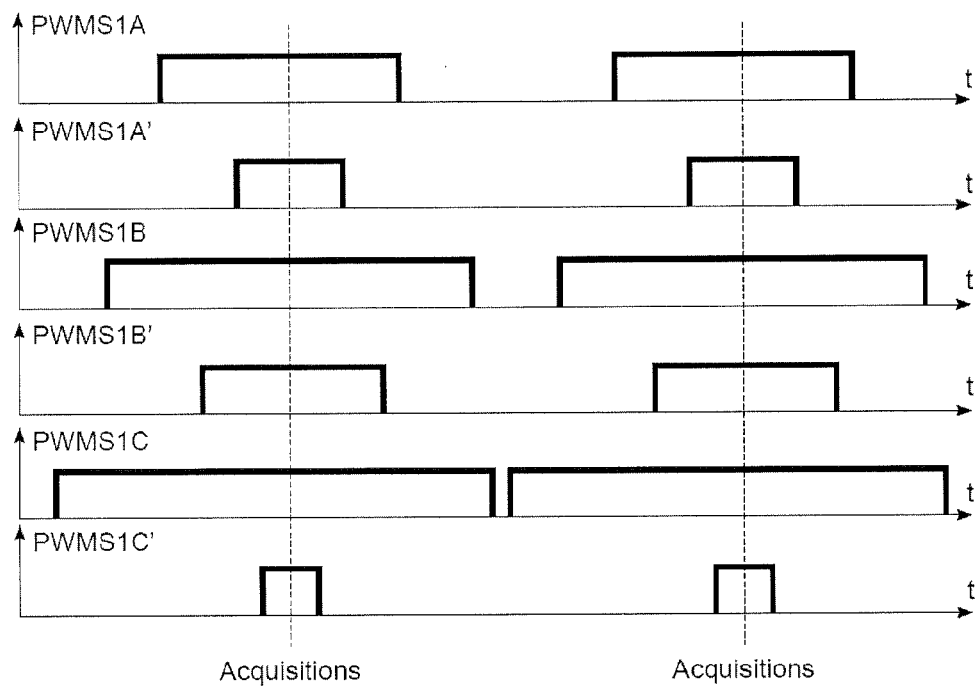
FIG. 3 shows a PWM control graph for a device according to FIG. 1.

This is shown by way of example in FIG. 3 which shows centred PWM (pulse width modulation) controls.

In this figure, PWM S1A represents the PWM control for the switch S1A, PWM S1A' represents the PWM control for the switch S1A', PWM S1B represents the PWM control for the switch S1B, PWM S1B' represents the PWM control for the switch S1B', PWM S1C represents the PWM control for the switch S1C and PWM S1C' represents the PWM control for the switch S1C'.

Figure 4:
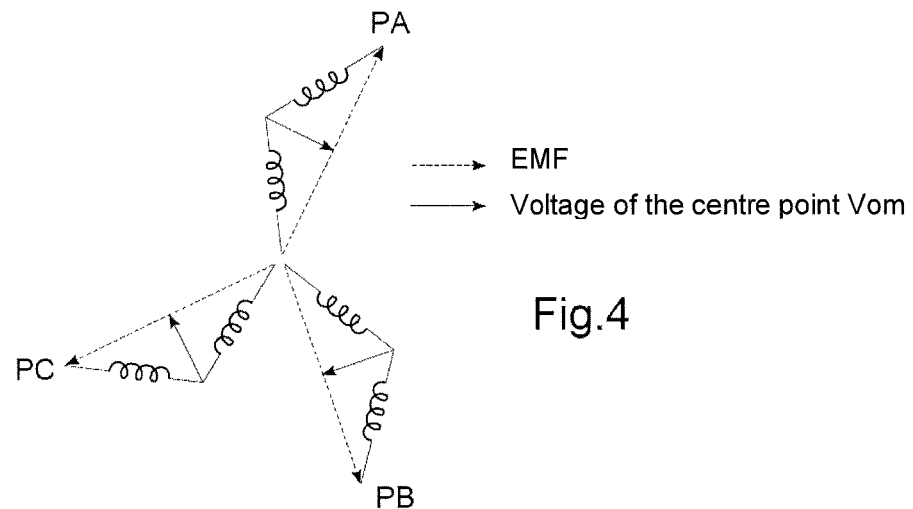
FIG. 4 is a vector graphic representation of the measurements of the electromotive force of a three-phase motor, FIG. 5 schematically represents a second exemplary embodiment of the device, FIG. 6 schematically represents the circuit of FIG. 5 in which the inverter is switched to allow for the centre point voltages to be measured.

FIG. 4 shows a diagram which explains the link between the EMFs of each phase and the voltage measurements at the centre point of the windings of each phase of the motor. It will be understood that it is a vectorial relationship (which explains the existence of the phase shift and of the gain).

Figure 5:
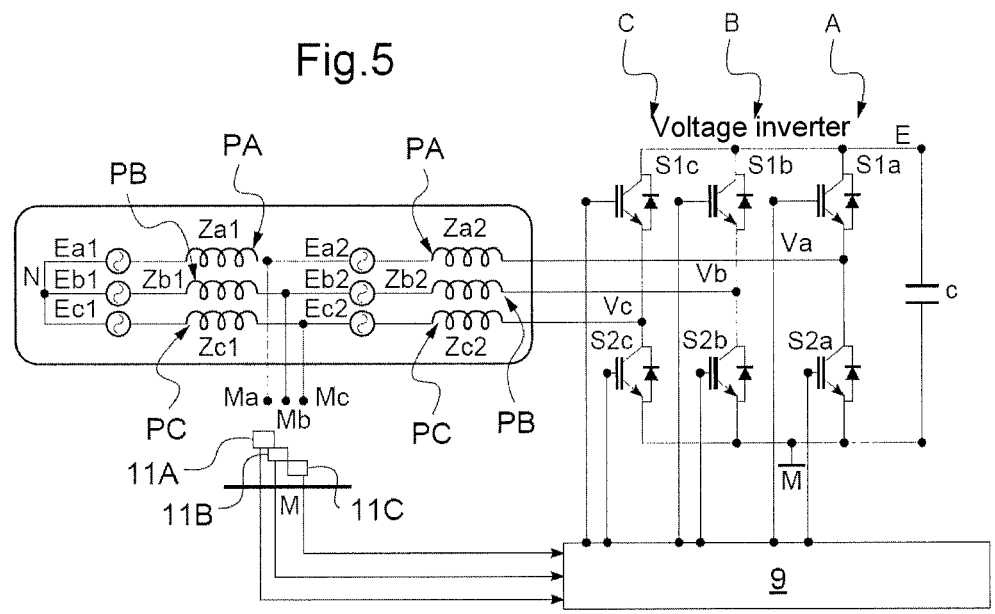

The present invention can also be applied, in a manner similar to the preceding example, to a standard inverter 5 and a three-phase motor 3 with neutral point and comprising windings with centre point, as represented in FIG. 5.

The inverter 5 in this example comprises three branches A, B and C with, respectively, two switching elements per branch, respectively S1a, S2a, S1b, S2b and S1c, S2c.

The motor 3 comprises, on at least one winding of at least one phase, a point for measuring a voltage relative to a predefined potential, the measurement point being chosen so that it divides the winding into a first and a second portion (in this case Za1 and Za2 for phase A, Zb1 and Zb2 for phase B and Zc1 and Zc2 for phase C) such that the electromotive forces induced in the two portions of a winding of a phase are phase-shifted relative to one another.

In the present example, these measurement points are advantageously made to be the same as the centre points Ma, Mb and Mc of the windings of the phases PA, PB and PC.

Means 11A, 11B and 11C for measuring the voltage between the measurement points Ma, Mb and Mc and a predefined potential, for example the ground M of the circuit, while the inverter has switched the phases concerned A, B, C to freewheeling mode, are provided and linked to the control unit 9.

Figure 6:
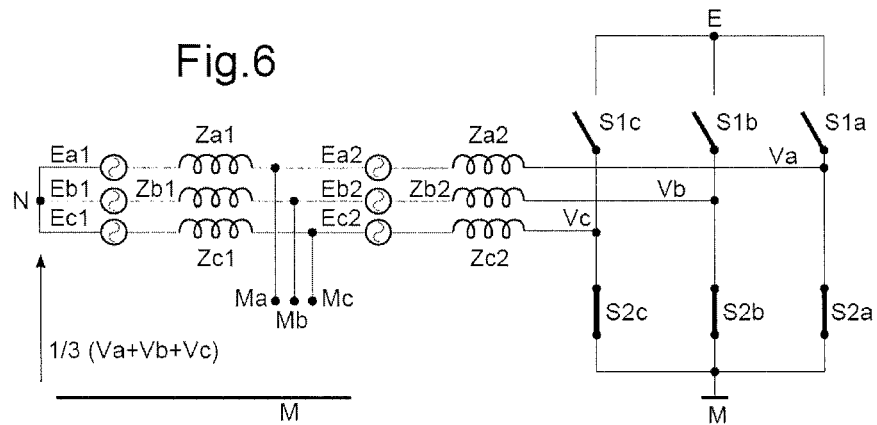

For more detail, reference should be made to FIG. 6 which represents the same circuit as FIG. 5 in which the switching elements S1a, S2a, S1b, S2b and S1c, S2c are schematically represented by switches.

As can be seen, the switches at the foot of each branch, that is to say the switches S2a, S2b and S2c are closed, that is to say that the phases A, B and C have been switched by the inverter 5 to freewheeling mode. Furthermore, when the switches S2A S2B S2C are closed, the voltage of the neutral point is 0, so a diagram equivalent to FIG. 2 applies.

It is therefore possible to determine, in a manner similar to the example of FIGS. 1 to 4, the electromotive force EMF of each phase, individually or all together synchronously.

As explained previously, the application of the present invention entails choosing a measurement point in such a way that the winding of a phase is divided into a first and a second portion such that the electromotive forces induced in the two portions are phase-shifted relative to one another.

This can be obtained, for example, by virtue of the use of a fractional step electric motor (fractional step polyphase motor), that is to say, a machine whose mechanical step corresponds to a fraction of the electrical angle.

A fractional step machine has the particular feature of having windings belonging to the same phase, but electrically phase-shifted.

Figure 7:
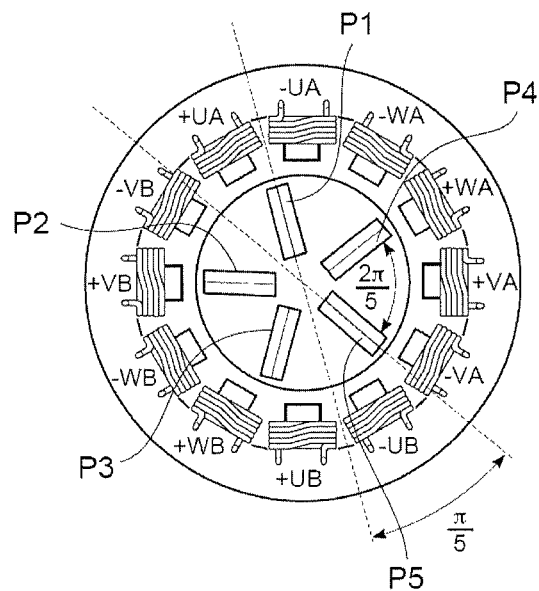
FIG. 7 is a simplified diagram of a fractional step alternating current electric motor.

FIG. 7 gives the example of an electric machine (motor) commonly called 12-10, or twelve notches with their windings +UA, −UA, +VA, □VA, +WA, □WB, +UB, □UB, +VB, □VB, +WB, □WB, and 10 poles (5 pairs of poles P1, P2, P3, P4, P5).

The pairs of poles are offset by a pitch of 2π/5, whereas the windings are offset by 2π/12.

According to the nomenclature used, a winding designated by the same letters but having a reverse sign is wound in the opposite direction. Thus, +UA is wound in the opposite direction of −UA.

In this motor, the three phases are designated U, V and W, each phase having four windings whose first letter designates the phase it belongs to, that is to say that the phase U has the windings +UA, □UA, +UB and −UB.

Depending on the desired characteristics of the motor, it is possible to envisage two ways of wiring to implement the present invention to directly measure the electromotive force of each phase.

Figure 8:
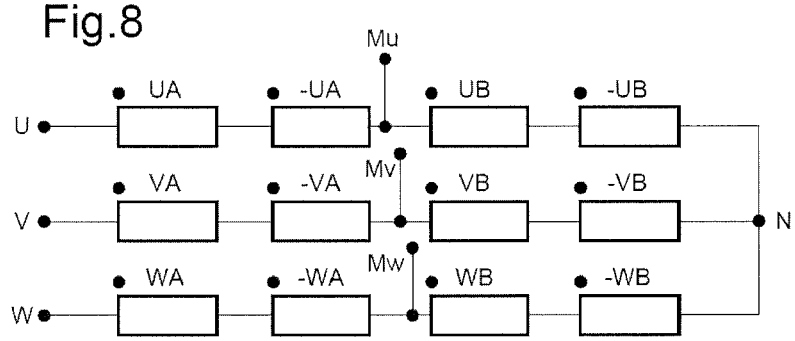
FIG. 8 shows a first example of wiring of the motor of FIG. 7.

According to a first way represented in FIG. 8, the four windings of one and the same phase are arranged in series and the measurement point (Mu, Mv and Mw) for measuring the voltage corresponding to the electromotive force of a phase is the centre point between, on the one hand, two adjacent series windings of one and the same phase, for example +UA and −UA, and on the other hand the two other adjacent series windings of the same phase, arranged facing the first windings, that is to say +UB and −UB.

Thus, as an example, it can therefore be seen that the measurement point Mu for the phase U is chosen so that the winding of this same phase (the winding of the phase U is formed by the windings +UA, □UA, +UB, □UB) is divided into a first portion formed by +UA and −UA, and a second portion formed by +UB and □UB such that the electromotive forces induced in these two portions are phase-shifted.

Figure 9:
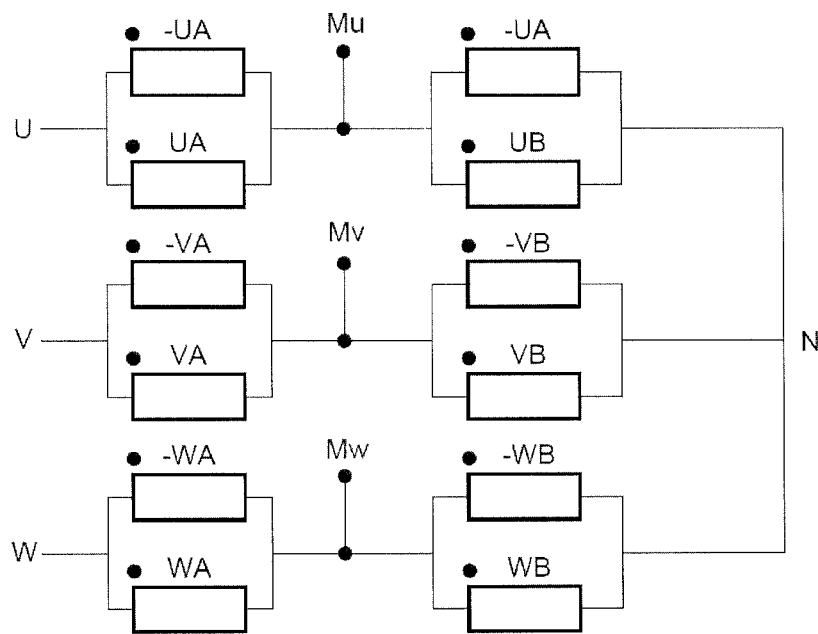
FIG. 9 shows a second example of wiring of the motor of FIG. 7.

According to a second way represented in FIG. 9, the go and return windings (for example UA and −UA) of one and the same phase are arranged in parallel and the measurement point (Mu, Mv or Mw) for measuring the voltage corresponding to the electromotive force of a phase is the centre point between, on the one hand, two parallel adjacent windings of one and the same phase, for example +UA and −UA, and on the other hand, the other two adjacent parallel windings of the same phase, arranged facing the first windings, that is to say +UB and −UB.

Figure 10:
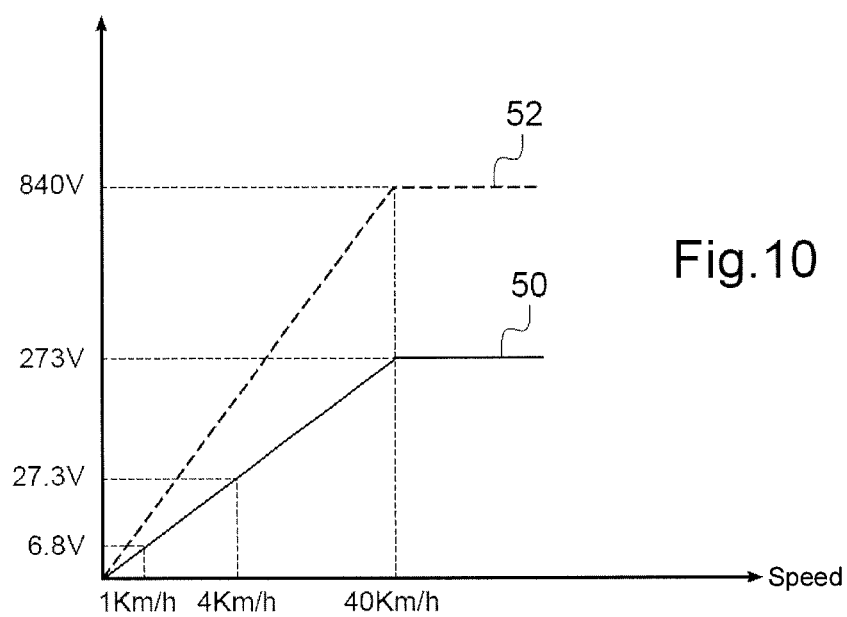
FIG. 10 shows, on a graph, a representative example of the measurements of the electromotive force as a function of the speed of an automotive vehicle equipped with the device according to the invention.

FIG. 10 shows by way of example, for an electric vehicle, as a function of the speed, the amplitude of the voltage measurements $V_{OM}$ by solid line along the curve 50 and the deduced electromotive force along the curve 52 in broken lines.

As is shown in FIGS. 1 and 5, the unit 9 for controlling the motor is linked to said measurement means 11A, 11B and 11C and is configured to deduce from the measurement result for each phase the electromotive force for each of the phases of the motor and to control the inverter according to the measured electromotive forces.

The term "sensorless" control then applies, since there is no position sensor directly measuring the physical position quantity.

In addition to the simplicity in controlling the machine which results from the use of the direct measurement of the EMF, it is possible to envisage sensorless position control.

Of course, when stopped, the position is not known, but all that is required is to excite the stator with enough current to start the rotor moving, and if the EMF generated is sufficiently great, then the control unit 9 can also deduce the position by virtue of the EMF measurement. The unit 9 can then correctly calculate the voltages to be applied to each phase by PWM controls to obtain, on the one hand, the required motor torque and direction of rotation.

Such a starting phase, if short, may be imperceptible to the driver.

If we take the example of a gear of ratio 10 and of wheels of diameter 70 cm, at 40 km/h, the machine revolves at 3000 rpm$^{-1}$. At 1 km/h, the machine revolves at 1.25 rpm$^{-1}$ which corresponds to (0.125 wheel revolution in 1 s). All that would be required in reality would be one electrical revolution to easily identify the angle of the rotor. In the example of the 12-10 machine described above, all that would then be required would be ⅕ of a revolution or 200 ms (0.025 wheel revolution). This displacement would be imperceptible to the driver because it corresponds to 5.5 cm of displacement.

The measured EMF would be 6.8 V (see FIG. 10). If the measurement resolution is sufficient, 1e computer could calculate to find the position.

Moreover, the control unit 9 is configured to deduce the angular position of the motor from the zero crossings of the electromotive forces of each phase.

In practice, detecting the zero crossings is an operation that is simple to perform via an electronic circuit or by software.

Figure 11:
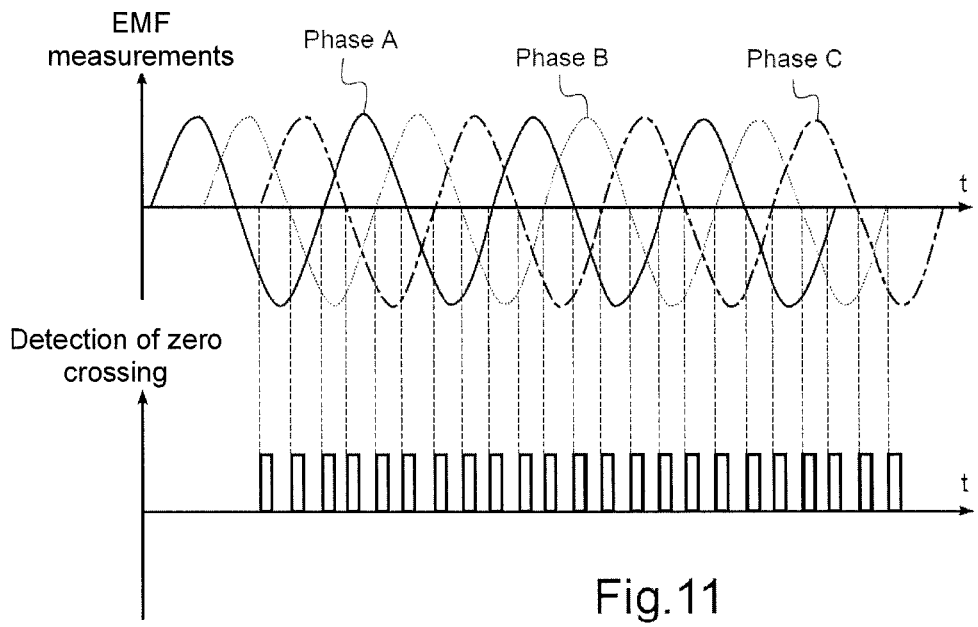
FIG. 11 shows, on a graph, the time trend of the electromotive forces of the phases of a three-phase motor for the detection of the zero crossings.

With reference to FIG. 11, for a three-phase motor, two zero crossings per period and per phase are counted. Given the phase shift between phases, a total of six zero crossings per phase is counted. On the zero crossing of the EMF measurement, information is directly available concerning the angular position of the motor 3, and without calculation. Six position acquisitions are therefore obtained for each electrical period, which is more than sufficient in many applications in which the angular position of the rotor does not need to be known accurately at any instant.

Figure 12:
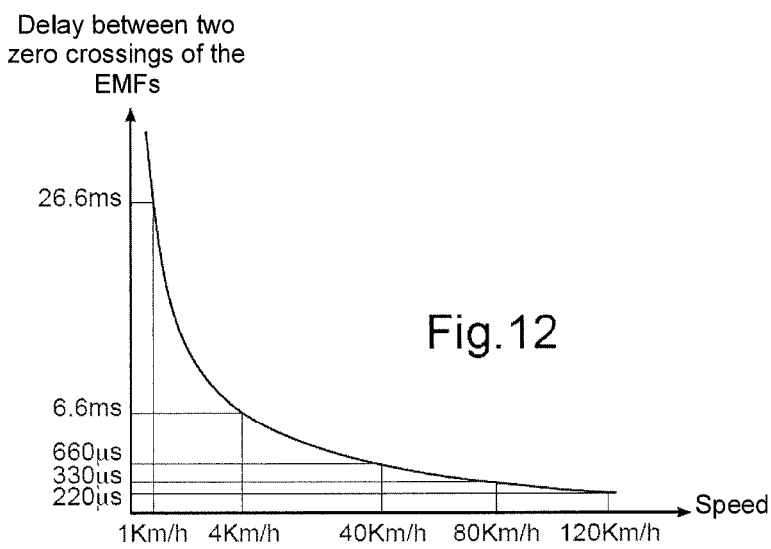
FIG. 12 shows the delay between two zero crossings of the EMFs measured as a function of speed.

FIG. 12 shows the delay between two zero crossings of the measured EMFs as a function of the speed of an electric automotive vehicle for an application concerning a machine with 12 notches and 5 pairs of poles with a gear of 10 and wheels of 70 cm diameter.

According to yet another aspect, the control unit 9 is configured to deduce a diagnosis from the measurement of the electromotive forces of each phase of the motor.

In practice, these measurements provide a non-intrusive way of detecting a failure, for example, of a phase of the motor, and of generating a warning signal.

Even with a failed phase, it is still possible to move with the vehicle and the user can go to a service station and the PWM controls can be adapted to take account of the failed phase.

It can therefore be understood that, by virtue of the invention, it is possible to easily and directly measure the electromotive force of each phase of a motor. There is no longer a need for a specific sensor. The control circuits of the motor are then simplified and less costly.

Obviously, the present invention applies to any alternating current electric motor, regardless of the number of phases.

It should also be recalled that the expression "electric motor" should be understood to mean an electric machine in the broad sense, that is to say a propulsion motor if the machine is electrically powered or a current generator if the inverter is switched to charge mode to recover the electrical energy produced by the motor.

The invention claimed is:

1. An electric device comprising:
   an alternating current electric motor; and
   a control inverter for controlling the phase or phases of the motor,
   wherein the motor comprises:
      on at least one winding of at least one phase, a point for measuring a voltage relative to a predefined potential, wherein the measurement point is chosen so that it divides the at least one winding into a first portion and a second portion such that the electromotive forces induced in the first and second portions are phase-shifted relative to one another, and
      means for measuring the voltage between the measurement point and the predefined potential configured to measure the voltage while the inverter has switched the at least one phase concerned to freewheeling mode.

2. The device according to claim 1, wherein the windings of the motor are windings with a center point and wherein the measurement point is the center point of the at least one winding.

3. The device according to claim 1, wherein the electromotive force induced in each of the first and second portions of the at least one winding is of substantially equal amplitude.

4. The device according to claim 1, wherein the inverter is configured to synchronously switch all the phases to freewheeling mode to allow for the simultaneous measurement of the voltages for each phase of the motor.

5. The device according to claim 1, wherein the inverter is a standard three-phase inverter.

6. The device according to claim 1, wherein the inverter is an H-configuration three-phase bridge inverter.

7. The device according to claim 1, wherein the alternating current electric motor is a polyphase electric motor whose mechanical step corresponds to a fraction of a mechanical angle.

8. The device according to claim 1, wherein the alternating current electric motor is an alternating current three-phase electric motor.

9. The device according to claim 1, further comprising:
a motor control unit linked to said measurement means and configured to deduce, from the measurement result for each phase, the electromotive force for each of the phases of the motor and to control the inverter according to the measured electromotive forces.

10. The device according to claim 9, wherein the motor control unit is configured to deduce an angular position of the motor from zero crossings of the electromotive forces of each phase.

11. A method for measuring the electromotive force of an electric device comprising an alternating current electric motor and a control inverter for controlling the phase or phases of the motor, the method comprising:
measuring a voltage between the measurement point of a winding of at least one phase and a predefined potential, the measurement point being chosen so that it divides the winding into a first portion and a second portion such that electromotive forces induced in the first and second portions are phase-shifted relative to one another, wherein measuring of the voltage is performed while the inverter has switched the concerned phases to freewheeling mode.

12. The method according to claim 11, wherein the windings of the motor are windings with a center point and wherein the measurement point is the center point of the winding.

13. The method according to claim 11, the electromotive force induced in each of the first and second portions of a winding is of substantially equal amplitude.

14. The method according to claim 11, wherein all the phases are switched synchronously by a pulse width modulation to freewheeling mode to allow for the simultaneous measurement of the voltages for each phase of the motor.

15. The method according to claim 11, wherein the inverter is a standard three-phase inverter.

16. The method according to claim 11, wherein the inverter is an H-configuration three-phase bridge inverter.

17. The method according to claim 11, wherein the alternating current electric motor is a polyphase electric motor whose mechanical step corresponds to a fraction of an electrical angle.

18. The method according to claim 11, wherein the alternating current electric motor is a three-phase electric motor.

19. The method according to claim 11, wherein the electromotive force for each of the phases of the motor is deduced from the voltage measurements for each of the phases and the inverter is controlled according to the measured electromotive forces.

20. The method according to claim 19, wherein the angular position of the motor is deduced from the zero crossings of the electromotive forces of each phase.

21. The method according to claim 11, wherein a diagnosis is deduced from the measurement of the electromotive forces of each phase of the motor and wherein a warning signal is generated in case of failure of one of the phases.

* * * * *